United States Patent
Park et al.

(10) Patent No.: US 12,111,674 B2
(45) Date of Patent: Oct. 8, 2024

(54) SYSTEM-ON-CHIP AND AN OPERATING METHOD THEREOF

(71) Applicant: SAMSUNG ELECTRONICS CO., LTD., Suwon-si (KR)

(72) Inventors: Choonghoon Park, Suwon-si (KR); Jong-Lae Park, Anyang-si (KR); Bumgyu Park, Suwon-si (KR); Youngtae Lee, Seoul (KR); Donghee Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 17/720,483

(22) Filed: Apr. 14, 2022

(65) Prior Publication Data

US 2023/0071632 A1  Mar. 9, 2023

(30) Foreign Application Priority Data

Sep. 6, 2021  (KR) .......................... 10-2021-0118488

(51) Int. Cl.
  *G06F 1/26* (2006.01)
  *G05F 1/46* (2006.01)
  (Continued)

(52) U.S. Cl.
  CPC ................ *G05F 1/66* (2013.01); *G05F 1/462* (2013.01); *G06F 1/3243* (2013.01); *G06F 1/3296* (2013.01); *G06F 15/7807* (2013.01)

(58) Field of Classification Search
  CPC .......... G05F 1/66; G05F 1/462; G06F 1/3243; G06F 1/3296; G06F 15/7807; G06F 1/324; Y02D 10/00
  See application file for complete search history.

(56) References Cited

U.S. PATENT DOCUMENTS

| | | |
|---|---|---|
| 7,685,446 B2 | 3/2010 | Hong et al. |
| 7,971,073 B2 | 6/2011 | Hsu et al. |

(Continued)

FOREIGN PATENT DOCUMENTS

KR    10-1655030    9/2016

OTHER PUBLICATIONS

Rotem Efraim et al., "Energy Aware Race to Halt: A Down to EARtH Approach for Platform Energy Management", IEEE Computer Architecture Letters, vol. 13, No. 1, Jan.-Jun. 2014.

*Primary Examiner* — Xuxing Chen
(74) *Attorney, Agent, or Firm* — F. CHAU & ASSOCIATES, LLC

(57) ABSTRACT

An operating method of a system-on-chip (SoC) which includes a processor including a first core and a dynamic voltage and frequency scaling (DVFS) module and a clock management unit (CMU) for supplying an operating clock to the first core, the operating method including: obtaining a required performance of the first core; finding available frequencies meeting the required performance; obtaining information for calculating energy consumption for each of the available frequencies; calculating the energy consumption for each of the available frequencies, based on the information; determining a frequency, which causes minimum energy consumption, from among the available frequencies as an optimal frequency; and
  adjusting an operating frequency to be supplied to the first core to the optimal frequency.

16 Claims, 6 Drawing Sheets

(51) Int. Cl.
*G05F 1/66* (2006.01)
*G06F 1/32* (2019.01)
*G06F 1/3234* (2019.01)
*G06F 1/3296* (2019.01)
*G06F 15/78* (2006.01)

(56) References Cited

U.S. PATENT DOCUMENTS

| | | | |
|---|---|---|---|
| 8,364,998 B2 | 1/2013 | Hsu et al. | |
| 9,285,858 B2 | 3/2016 | Klassen et al. | |
| 9,740,259 B2 | 8/2017 | Bourdelles et al. | |
| 10,108,212 B2 | 10/2018 | Park et al. | |
| 10,739,804 B2 | 8/2020 | Vangal et al. | |
| 2011/0271283 A1* | 11/2011 | Bell, Jr. | G06F 9/5094 718/102 |
| 2012/0084580 A1* | 4/2012 | Harchol-Balter | G06F 9/5094 713/310 |
| 2013/0326527 A1* | 12/2013 | Suzuki | G06F 1/28 718/102 |
| 2014/0068285 A1* | 3/2014 | Lee | G06F 1/3296 713/300 |
| 2015/0015589 A1* | 1/2015 | Chung | G06F 1/3206 345/501 |
| 2015/0161307 A1 | 6/2015 | Ueki | |
| 2016/0054775 A1* | 2/2016 | Rajappa | G06F 1/3234 713/320 |
| 2016/0062447 A1* | 3/2016 | Hsu | G06F 1/3243 713/300 |
| 2016/0342191 A1* | 11/2016 | On | G06F 1/329 |
| 2017/0083383 A1* | 3/2017 | Rider | G06F 9/4893 |
| 2018/0120920 A1* | 5/2018 | Iyigun | G06F 1/3203 |
| 2018/0210531 A1* | 7/2018 | Shahneous Bari | G06F 3/0679 |
| 2018/0232033 A1* | 8/2018 | Gu | G06F 1/324 |
| 2019/0041949 A1* | 2/2019 | Al-Rawi | H04L 12/12 |
| 2020/0319690 A1* | 10/2020 | Sodhi | G06F 1/28 |
| 2021/0012747 A1* | 1/2021 | Wang | G06F 1/3206 |
| 2021/0165477 A1* | 6/2021 | Ding | G06F 1/3296 |

\* cited by examiner

FIG. 4

TBF

| Frequency |
|---|
| f1 |
| f2 |
| ⋮ |
| fn |

FIG. 5

TBV

| Voltage |
|---|
| V1 |
| V2 |
| ⋮ |
| Vm |

FIG. 6

TBL

| Voltage | Temperature | Leakage |
|---|---|---|
| V1 | tmp1 | PL1 |
| V2 | tmp2 | PL2 |
| ⋮ | ⋮ | ⋮ |
| Vm | tmpk | PLs |

| Voltage | Temperature | Leakage | Dynamic Power |
|---|---|---|---|
| V1 | tmp1 | PL1 | PD1 |
| V1 | tmp2 | PL2 | PD1 |
| ⋮ | ⋮ | ⋮ | ⋮ |
| Vm | tmpk | PLs | PDr |

Frequency = f1 ... Frequency = fn

TBP

SYSTEM-ON-CHIP AND AN OPERATING METHOD THEREOF

CROSS-REFERENCE TO RELATED APPLICATION

This application claims priority under 35 U.S.C. § 119 to Korean Patent Application No. 10-2021-0118488 filed on Sep. 6, 2021, in the Korean Intellectual Property Office, the disclosure of which is incorporated by reference herein in its entirety.

TECHNICAL FIELD

Embodiments of the present disclosure described herein relate to a system-on-chip and an operating method thereof, and more particularly, to a method for performing dynamic voltage and frequency scaling (DVFS) with the system-on-chip.

DISCUSSION OF RELATED ART

A system-on-chip (SoC) is an integrated circuit (IC) that integrates all or most components of a computer or other electronic system. For example, a SoC may integrate various function blocks, such as a central processing unit (CPU), a memory, an interface, a digital signal processing circuit, and an analog signal processing circuit, in one semiconductor IC to implement a computing system or any other computing system.

A dynamic voltage and frequency scaling (DVFS) technology may be used to manage a power of the SoC. The DVFS technology refers to the adjustment of power and speed settings on a computing device's various processors, controller chip and peripheral devices to optimize resource allotment for tasks and maximize power saving when those resources are not needed. For example, the operating frequency or the operating voltage of the SoC may be dynamically scaled based on performance necessary for an operation of a system. In a SoC installed in a mobile device, a computing system is required to operate with a low power. As such, there is a need to reduce power consumption of a processor in the computing system.

SUMMARY

Embodiments of the present disclosure provide a system-on-chip for performing Dynamic Voltage and Frequency Scaling (DVFS) and an operating method thereof.

According to an embodiment of the present disclosure, there is provided an operating method of a system-on-chip (SoC) which includes a processor including a first core and a DVFS module and a clock management unit (CMU) for supplying an operating clock to the first core, the operating method including: obtaining a required performance of the first core; finding available frequencies meeting the required performance; obtaining information for calculating energy consumption for each of the available frequencies; calculating the energy consumption for each of the available frequencies, based on the information; determining a frequency, which causes minimum energy consumption, from among the available frequencies as an optimal frequency; and adjusting an operating frequency to be supplied to the first core to the optimal frequency.

According to an embodiment of the present disclosure, there is provided an operating method of an SoC which includes a processor including a first cluster, which includes a first core and a second core, and a DVFS module and a CMU for supplying an operating clock to the first core, the operating method including: obtaining a required performance of the first core; finding available frequencies meeting the required performance; obtaining information for calculating energy consumption for each of the available frequencies; calculating the energy consumption for each of the available frequencies, based on the information; determining a frequency, which causes minimum energy consumption, from among the available frequencies as an optimal frequency; and adjusting an operating frequency to be supplied to the first core to the optimal frequency, wherein the information includes a level of an operating voltage of the second core included in the first cluster.

According to an embodiment of the present disclosure, there is provided an SoC including: a processor including a first core; a CMU configured to generate an operating clock and supply the operating clock to the first core, under control of the processor; and a memory configured to store a DVFS program, wherein the DVFS program, when executed by the processor, causes the processor to: obtain a required performance of the first core; find available frequencies meeting the required performance; obtain information for calculating energy consumption for each of the available frequencies; calculate the energy consumption for each of the available frequencies, based on the information; determine a frequency, which causes minimum energy consumption, from among the available frequencies as an optimal frequency; and scale an operating frequency to be supplied to the first core to the optimal frequency.

BRIEF DESCRIPTION OF THE FIGURES

The above and other features of the present disclosure will become apparent by describing in detail embodiments thereof with reference to the accompanying drawings.

FIG. 4 illustrates a frequency table, according to some embodiments of the present disclosure.

FIG. 5 illustrates a voltage table, according to some embodiments of the present disclosure.

FIG. 6 illustrates a leakage power table, according to some embodiments of the present disclosure.

DETAILED DESCRIPTION OF THE EMBODIMENTS

Hereinafter, embodiments of the present disclosure will be described in more detail with reference to accompanying drawings. In the present disclosure, like components/elements may be marked by like reference signs/numerals in drawings, and thus, additional description may be omitted.

Figure 1:
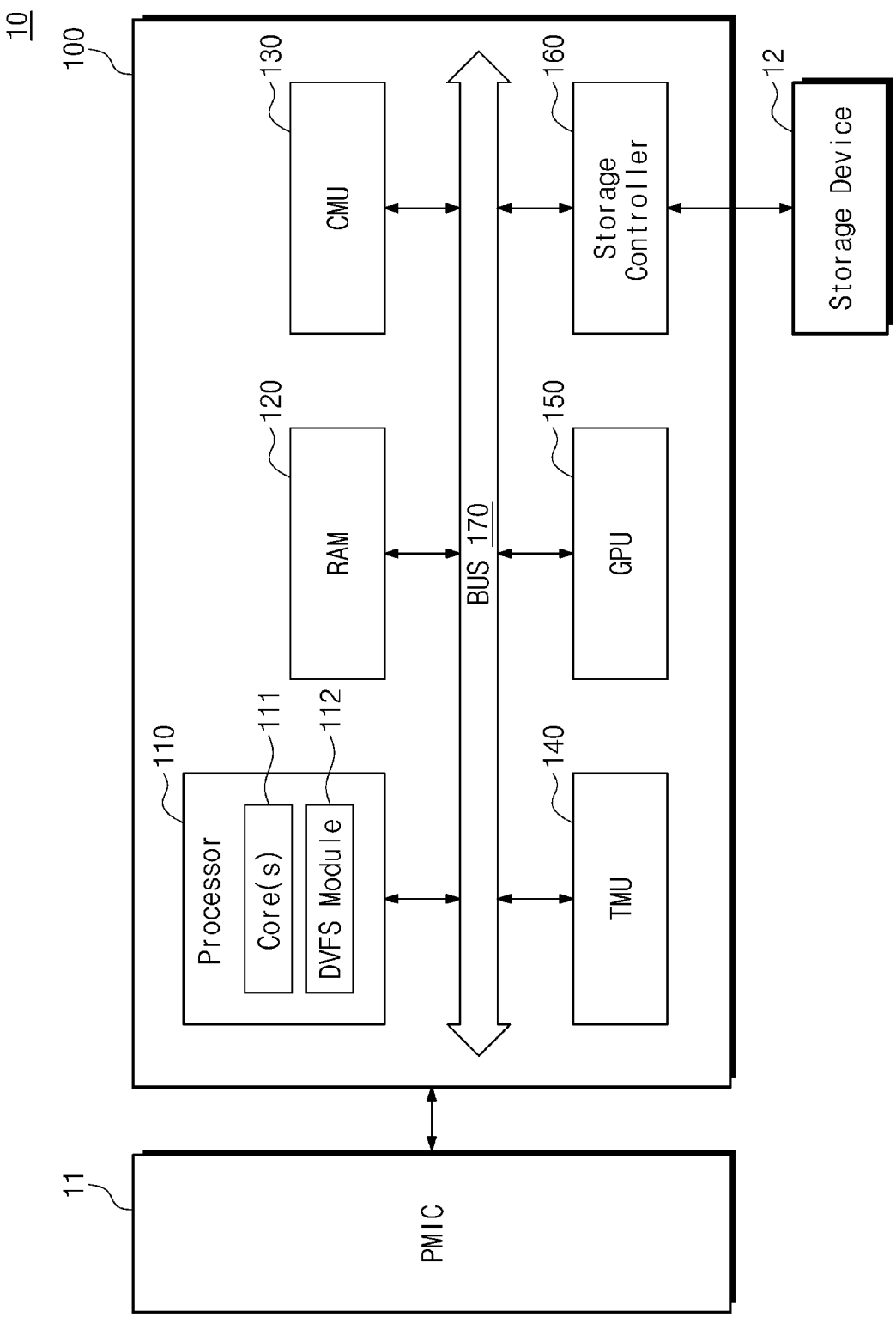
FIG. 1 illustrates a block diagram of a computing system, according to some embodiments of the present disclosure.

FIG. 1 illustrates a block diagram of a computing system 10, according to some embodiments of the present disclosure. Referring to FIG. 1, the computing system 10 may include a system-on-chip (SoC) 100, a power management integrated circuit (PMIC) 11, and a storage device 12. In some embodiments, the computing system 10 may be implemented as a computing system including at least one of various electronic devices such as a computer, a notebook computer, a mobile phone, a smartphone, a personal digital assistant (PDA), a portable multimedia player (PMP), a digital television (TV), a digital camera, a portable game console, a navigation device, a wearable device, an Internet of Things (IoT) device, an Internet of Everything (IoE) device, an E-book, a virtual reality (VR) device, and an augmented reality device.

The SoC 100 may include a processor 110, a random access memory (RAM) 120, a clock management unit (CMU) 130, a temperature management unit (TMU) 140, a graphics processing unit (GPU) 150, a storage controller 160, and a bus 170.

The processor 110 may perform various operations necessary to drive the SoC 100. For example, the processor 110 may execute software, firmware, an instruction, or a program code loaded onto the RAM 120. The processor 110 may execute the software, firmware, instruction, or program code, based on an operating clock output from the CMU 130. The processor 110 may execute an operating system that is loaded onto the RAM 120. The processor 110 may execute various application programs that are driven based on the operating system. The processor 110 may store results of the operations in the RAM 120 or may transmit the results to the GPU 150. The processor 110 may request the GPU 150 for processing of graphics data.

The processor 110 may include one or more cores 111 and a dynamic voltage and frequency scaling (DVFS) module 112. The one or more cores 111 may be homogeneous or heterogeneous. When the processor 110 includes at least two cores, the processor 110 may be called a "multi-core processor", and the SoC 100 may be called a "multi-core system". Each of the one or more cores 111 may be implemented as a processor core that is capable of being driven independently. For example, each of the one or more cores 111 may independently read and execute program instructions.

The one or more cores 111 may be grouped into a plurality of clusters that operate based on an independent operating clock and/or an independent power. For example, a first cluster may operate based on a first clock and a first power and a second cluster may operate based on a second clock and a second power. Cores belonging to the same cluster may be included in a clock domain in which the cores operate based on the same operating clock and/or a power domain (or voltage domain) in which the cores operate based on the same supply power. The one or more cores 111 thus grouped will be described in detail with reference to FIG. 8.

The DVFS module 112 may control an operating frequency of each of the one or more cores 111 (e.g., a frequency of an operating clock provided to each of the one or more cores 111) or an operating voltage of each of the one or more cores 111 (or a voltage level of a power provided to each of the one or more cores 111) in the DVFS manner. The DVFS module 112 may determine an operating frequency of a target core in consideration of required performance of the target core.

In some embodiments of the present disclosure, the DVFS module 112 may determine a frequency at which energy consumption of the target core is minimized, as an operating frequency of the target core. For example, the DVFS module 112 may calculate energy consumption for each of available frequencies meeting the required performance of the target core by considering various factors, which affect a magnitude of a static power, such as a workload execution time of a core, a relationship between an operating frequency and an operating voltage of the core, and a temperature. The DVFS module 112 may determine a frequency, at which energy consumption is minimum, as an optimal frequency and may set the optimal frequency as an operating frequency of a core. As such, a workload processing time and energy consumption of a core may be minimized (or optimized). The control of the operating frequency that is performed based on the DVFS module 112 will be described in detail later.

In some embodiments of the present disclosure, the DVFS module 112 may be implemented in the form of software (or a program) that is loaded onto the RAM 120 and is executed by the processor 110. In some embodiments of the present disclosure, the DVFS module 112 may control at least one of the one or more cores 111, the RAM 120, the CMU 130, or the PMIC 11; in this case, the operating system and/or middleware may intervene between the DVFS module 112 and each component. Alternatively, in some embodiments of the present disclosure, the DVFS module 112 may be implemented in the form of separate hardware or in the form of a combination of hardware and software.

The RAM 120 may store information or data necessary for the processor 110 and the GPU 150 to process data. The RAM 120 may store data processed by the processor 110 and the GPU 150. The RAM 120 may store software, firmware, a program code, or an instruction that is executable by the processor 110 or the GPU 150. For example, the RAM 120 may store a DVFS program that is executable by the processor 110. The RAM 120 may include a volatile memory such as a static random access memory (SRAM) or a dynamic RAM (DRAM) or a nonvolatile memory such as a flash memory, a phase-change RAM (PRAM), a magneto-resistive RAM (MRAM), a resistive RAM (ReRAM), or a ferro-electric RAM (FRAM). In some embodiments of the present disclosure, the RAM 120 may be called a buffer memory, a cache memory, or a working memory.

The CMU 130 may generate an operating clock. The operating clock that is generated by the CMU 130 may be provided to the components of the SoC 100. For example, the processor 110, the GPU 150, or the storage controller 160 may operate based on the operating clock provided from the CMU 130. A frequency of the operating clock that is generated by the CMU 130 may be adjusted under control of the DVFS module 112. In some embodiments of the present disclosure, the CMU 130 may include a circuit or a device for generating the operating clock, such as a phase locked loop (PLL), a delayed locked loop (DLL), or a crystal oscillator.

The TMU 140 may control a temperature of the SoC 100. For example, the SoC 100 may include a temperature sensor for measuring a temperature of the SoC 100 or a component (e.g., the processor 110 or one of the cores 111) of the SoC 100. The TMU 140 may generate a control signal for dynamic thermal management (DTM) based on temperature information provided from the temperature sensor. For example, the TMU 140 may generate a control signal for limiting performance of the SoC 100 or a power level of the SoC 100 in response to the temperature information provided from the temperature sensor. A temperature of the SoC 100 may decrease in response to the control signal generated by the TMU 140. In some embodiments of the present disclosure, the TMU 140 may provide the DVFS module 112 with the temperature information provided from the temperature sensor.

The GPU 150 may perform various operations associated with graphics processing by using data transmitted from the processor 110 and data stored in the RAM 120. For example, the GPU 150 may process (or generate) graphics data by executing program codes or instructions stored in the RAM 120 or an internal memory of the GPU 150, or compiled codes provided from the processor 110. In some embodiments of the present disclosure, the GPU 150 may be used for computation for artificial intelligence or neural network implementation.

The storage controller 160 may access the storage device 12 under control of the processor 110. For example, data processed by the processor 110 or the GPU 150 may be stored in the storage device 12 through the storage controller 160, and the data stored in the storage device 12 may be provided to the processor 110 or the GPU 150 through the storage controller 160.

The PMIC 11 may provide an operating voltage to the SoC 100. For example, under control of the DVFS module 112, the PMIC 11 may generate an operating voltage to be used in each of the one or more cores 111 and may provide the generated operating voltage to each of the one or more cores 111.

In the embodiment of FIG. 1, the PMIC 11 may be implemented outside the SoC 100; in other embodiments of the present disclosure, the PMIC 11 may be included in the SoC 100.

The storage device 12 may be provided as a storage medium of the SoC 100. The storage device 12 may store application programs, an operating system image, and various kinds of data. The storage device 12 may be implemented as a memory card such as a multimedia card (MMC), an embedded MMC (eMMC), a secure digital (SD) card, or a microSD card.

Alternatively, the storage device 12 may include a nonvolatile memory such as a NAND flash memory, a NOR flash memory, a PRAM, an MRAM, a ReRAM, or a FRAM. In some embodiments of the present disclosure, unlike the illustrated embodiment, the storage device 12 may be implemented as a memory that is provided (or embedded) in the SoC 100.

Figure 2:
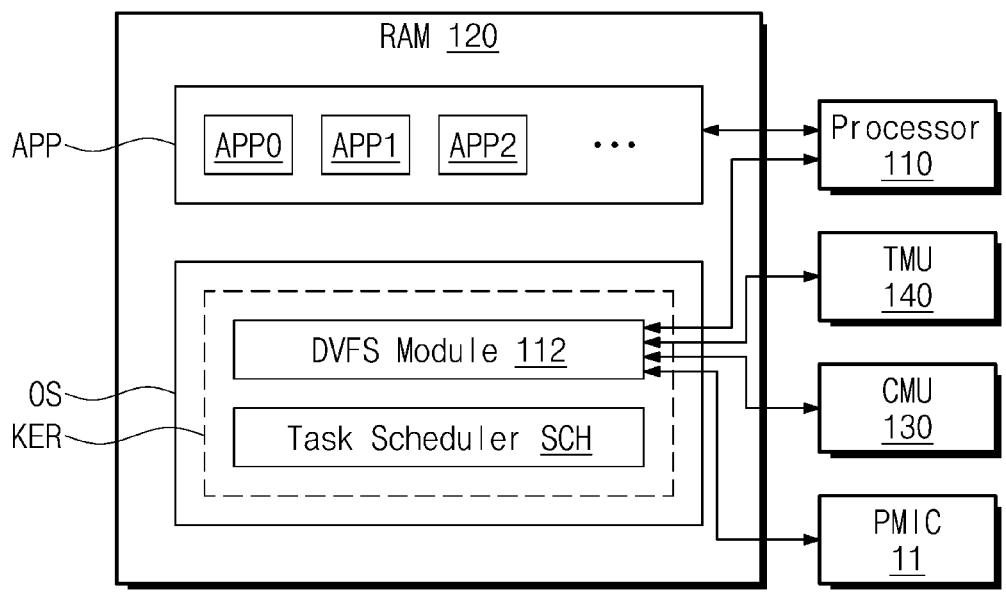
FIG. 2 illustrates a Dynamic Voltage and Frequency Scaling (DVFS) module implemented in a computing system, according to some embodiments of the present disclosure.

FIG. 2 illustrates the DVFS module 112 implemented in the computing system 10, according to some embodiments of the present disclosure. Referring to FIGS. 1 and 2, FIG. 2 may show an example of a software structure of the computing system 10 of FIG. 1. In the embodiment illustrated in FIG. 2, the DVFS module 112 may be implemented in the form of software that is loaded onto the RAM 120 and is executed by the processor 110.

A structure of software layers of the computing system 10, which are loaded onto the RAM 120 and are driven by the processor 110, may include application programs APP (APP0, APP1, APP2, . . . ) and a kernel KER of an operating system OS. In some embodiments of the present disclosure, the operating system OS may include device drivers for managing various devices such as a memory, a modem, and an image processing device.

The application programs APP may be software of an upper layer that is driven as a basic service and is driven by a request of the user. A plurality of application programs (e.g., application programs APP0, APP1, and APP2) may be simultaneously executed to provide various services to the user. Each of the application programs APP0, APP1, and APP2 to be executed may be loaded onto the RAM 120 and may then be executed by the processor 110. For example, when the reproduction of a video file is requested by the user, an application program (e.g., a video player) for reproducing a video may be executed. The executed player may generate a read request or a write request to the storage device 12 for the purpose of reproducing the video file that the user requests.

The kernel KER that is a component of the operating system OS may perform a control operation between the application programs APP and hardware. The kernel KER may include execution of a program, an interrupt, multitasking, memory management, a file system, and a device driver. In the illustrated embodiment, the kernel KER may include the DVFS module 112 and a task scheduler SCH.

The task scheduler SCH may monitor and manage task queues respectively associated with the cores 111 included in the processor 110. The task queues may refer to a queue of active tasks when a plurality of tasks are simultaneously performed. For example, tasks present in the task queues may be tasks to be processed soon by the processor 110 relative to other tasks (or tasks to be processed by the processor 110 prior to other tasks). In other words, tasks in a task queue may be processed prior to other tasks. The task scheduler SCH may determine a next process with reference to task information loaded onto the task queues. The task scheduler SCH may determine priorities of computing resources depending on priority values stored in the task queues. In some embodiments of the present disclosure, when the operating system OS is based on Linux, the task queues on the Linux-based kernel KER may correspond to the cores 111, respectively. The task scheduler SCH may allocate tasks corresponding to each of the task queues to the corresponding core.

In some embodiments of the present disclosure, the task scheduler SCH may track (or monitor) the cores 111 included in the processor 110, individually. The task scheduler SCH may calculate a required performance of each of the cores 111, based on the tracking result. For example, the required performance of one core may be the performance necessary to process a current workload of the core (or a task allocated to the core). The required performance of the core may include a minimum operating frequency that does not cause a delay of a service to be processed by the core. The task scheduler SCH may provide the DVFS module 112 with the calculated required performance.

The DVFS module 112 may perform a DVFS algorithm. The DVFS module 112 may determine a level of an operating voltage or an operating frequency to be provided to the processor 110 by performing the DVFS algorithm based on information provided from the task scheduler SCH, any other component(s) (e.g., the TMU 140 or the CMU 130) of the SoC 100, or the PMIC 11.

The DVFS module 112 may obtain a variety of information such as required performance of a core targeted for frequency adjustment, a frequency table of an operating clock to be provided to each core, a voltage level table of an operating power to be supplied to each core, temperature information of the SoC 100 or the processor 110, and leakage power information. The DVFS module 112 may calculate energy consumption associated with each of available frequencies of the core targeted for frequency adjustment, based on the obtained information. The DVFS module 112 may determine an optimal frequency of an operating clock based on a calculation result. In some embodiments of the present disclosure, the DVFS module 112 may further include software or hardware for adjusting a level of an operating voltage or an operating frequency to be provided to the processor 110.

Figure 3:
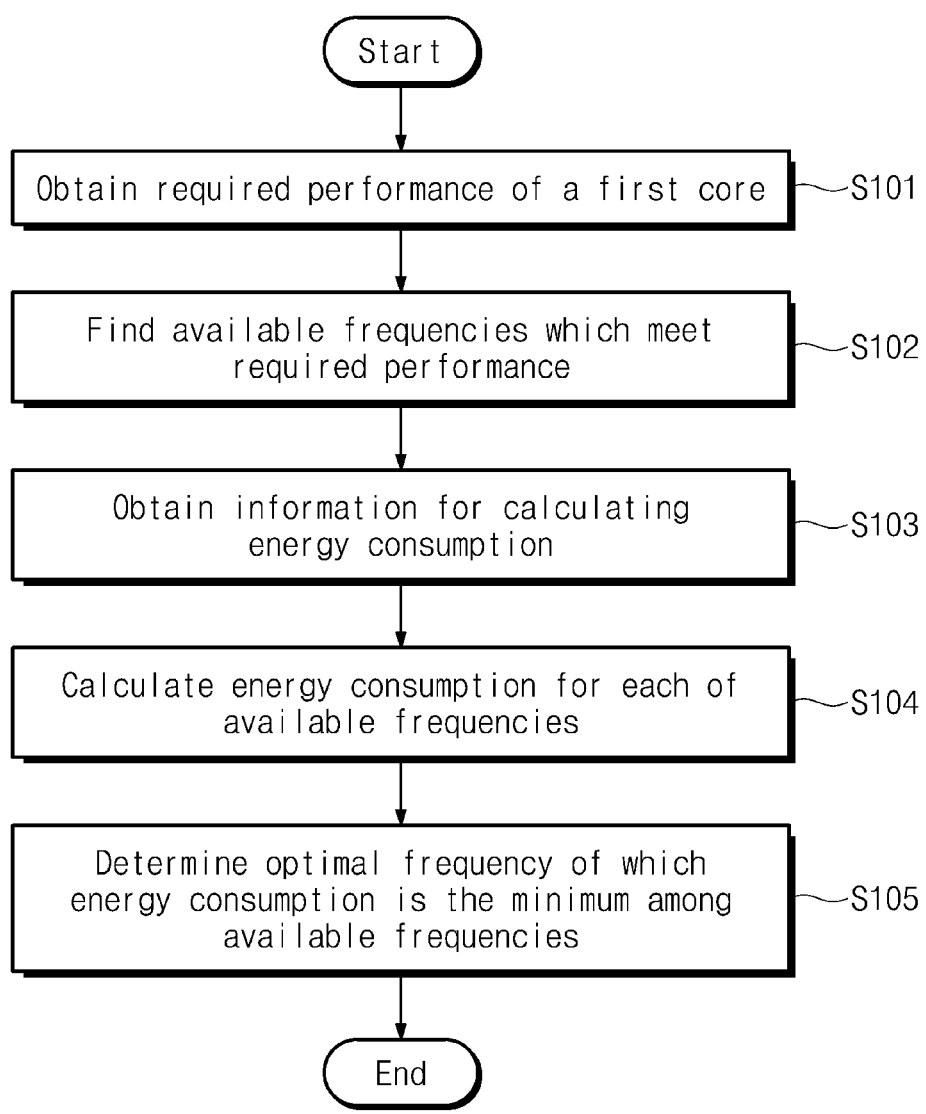
FIG. 3 illustrates a flowchart of a method for performing DVFS, according to some embodiments of the present disclosure.

FIG. 3 illustrates a flowchart of a method for performing DVFS, according to some embodiments of the present disclosure. Referring to FIGS. 1 to 3, the processor 110 of the SoC 100 may select an operating frequency to be provided to a first core, which is a DVFS target from among the one or more cores 111, by performing operation S101 to operation S105. In some embodiments of the present disclosure, the DVFS module 112 may perform operation S101 to operation S105 in response to a request from the processor 110. For example, the processor 110 may request the DVFS module 112 to perform the DVFS of the first core. As another example, the processor 110 may perform operation S101 to operation S105 through the DVFS module 112 (or by executing or controlling the DVFS module 112).

In operation S101, the DVFS module 112 may obtain a required performance of the first core. The required performance may be a minimum performance for performing an operation (or a task, a service, a workload, software, or an application program) to be currently executed by the first core without a delay (or within a given processing time). The required performance may include a minimum frequency of an operating frequency to be provided to the first core or a minimum level of an operating voltage to be provided to the first core. In other words, the DVFS module 112 may obtain a minimum operating frequency of the first core or a minimum operating voltage of the first core.

In some embodiments of the present disclosure, the DVFS module 112 may obtain the required performance from a client. The client may include the task scheduler SCH or the processor 110. The client may track (or monitor) a situation (e.g., workload) of the first core (or a domain to which the first core belongs). The client may calculate a minimum frequency capable of meeting (or providing) performance that the first core (or a domain to which the first core belongs) requires, based on the tracking by the client. The client may provide the calculated minimum frequency to the DVFS module 112.

In operation S102, the DVFS module 112 may find available frequencies meeting the required performance. For example, the DVFS module 112 may obtain a list (e.g., a frequency table TBF of FIG. 4) of frequencies capable of being used as an operating frequency to be supplied to the first core from the CMU 130. The DVFS module 112 may determine frequencies, which are higher than or equal to the minimum frequency meeting the required performance of the first core, from among the frequencies of the list as available frequencies. In other words, the DVFS module 112 may identify frequencies from the list that can be used as the operating frequency to be supplied to the first core.

In operation S103, the DVFS module 112 may obtain information for calculating energy consumption. For example, the information may include information (e.g., the frequency table TBF of FIG. 4) of frequencies capable of being used as an operating frequency to be provided from the CMU 130 to the first core, information (e.g., a voltage table TBV of FIG. 5) of voltage levels capable of being used as a level of an operating voltage (e.g., a voltage of an operating power) to be provided from the PMIC 11 to the first core, current temperature information of the first core obtained from the temperature sensor by the TMU 140, or leakage power information (e.g., a leakage power table TBL of FIG. 6).

The DVFS module 112 may obtain the information of the frequencies capable of being used as an operating frequency to be supplied to the first core from the CMU 130. The DVFS module 112 may obtain the information of the voltage levels capable of being used as an operating voltage level to be supplied to the first core from the PMIC 11. The DVFS module 112 may obtain the information of the current temperature information of the first core (or the processor 110 or the SoC 100) from the TMU 140. The DVFS module 112 may calculate a leakage power based on the frequency information, the voltage information, and the temperature information or may load a table including a leakage power calculated in advance onto the RAM 120 from the storage device 12.

In operation S104, the DVFS module 112 may calculate energy consumption associated with each of available frequencies. For example, the DVFS module 112 may calculate a dynamic power and a static power (or a leakage power) associated with each of the available frequencies, based on the information obtained in operation S103. The DVFS module 112 may calculate energy consumption associated with each of the available frequencies by calculating dynamic energy based on the calculated dynamic power, calculating static energy based on the calculated static power, and adding the dynamic energy and the static energy.

The dynamic power may be calculated by Equation 1 below.

$$P_{dynamic} = C * f * V^2 \qquad \text{[Equation 1]}$$

In Equation 1, $P_{dynamic}$ may represent a dynamic power. "C" may represent a capacitance value of a circuit and may depend on a load of the first core. "f" may represent an operating frequency (e.g., one of available frequencies) of the first core. "V" may represent a level of an operating voltage of the first core. The DVFS module 112 may calculate a dynamic power based on a level of an operating voltage currently supplied (or scheduled to be supplied) to the first core, for each of the available frequencies. The DVFS module 112 may calculate dynamic energy by multiplying the calculated dynamic power by a time when an operating clock of a first frequency is to be applied (e.g., a workload processing time).

A static power may be proportional to a temperature of the first core and a level of an operating voltage of the first core. The DVFS module 112 may calculate a static power based on a level of an operating voltage currently supplied (or scheduled to be supplied) to the first core and temperature information provided from the TMU 140, for each of the available frequencies. The DVFS module 112 may calculate static energy by multiplying the calculated static power by a time when a power is applied to the first core.

In some embodiments of the present disclosure, the DVFS module 112 may calculate energy consumption with reference to a dynamic power calculated in advance and a static power calculated in advance. For example, the DVFS module 112 may find a dynamic power calculated in advance, based on a level of an operating voltage currently supplied (or scheduled to be supplied) to the first core, for each of the available frequencies. The DVFS module 112 may find a static power calculated in advance, based on a level of an operating voltage currently supplied (or scheduled to be supplied) to the first core and temperature information provided from the TMU 140, for each of the available frequencies. The DVFS module 112 may calculate energy consumption necessary to process a current task of the first core, by calculating dynamic energy and static energy based on the dynamic power calculated in advance and the static power calculated in advance and adding the calculated dynamic energy and the calculated static energy.

In some embodiments of the present disclosure, in the case where it is difficult to predict (or measure) a workload processing time or a power application time, the DVFS module 112 may calculate unit energy consumption (or instantaneous energy consumption) by multiplying each of the calculated dynamic power and the calculated static power by a given unit time. For example, the DVFS module 112 may calculate unit dynamic energy by multiplying the calculated dynamic power by a given constant time such as a unit workload processing time or an average workload processing time. As in the above description, the DVFS module 112 may calculate unit static energy by multiplying the calculated leakage power by a given constant time such as a unit power supply time, a minimum power supply time, or an average power supply time.

In operation S105, the DVFS module 112 may determine a frequency, which causes minimum energy consumption, from among the available frequencies as an optimal frequency. For example, the DVFS module 112 may determine a frequency, which causes minimum energy consumption, from among the available frequencies as an optimal frequency, based on a result of the calculation in operation S104. Afterwards, the DVFS module 112 may scale an operating frequency of the first core (e.g., a frequency of an operating frequency provided from the CMU 130 to the first core) to an optimal frequency. In other words, the DVFS module 112 may adjust the operating frequency of the first core (e.g., the frequency of the operating frequency provided from the CMU 130 to the first core) to the optimal frequency.

In some embodiments of the present disclosure, while scaling the operating frequency of the first core to the optimal frequency, the DVFS module 112 may scale an operating voltage of the first core to an optimal voltage. For example, the DVFS module 112 may find first available voltages capable of being used with respect to a first frequency of the available frequencies, based on voltage information provided from the PMIC 11. The DVFS module 112 may calculate energy consumption at the first frequency, for each of the first available voltages. As in the above description, the DVFS module 112 may calculate available voltages for each of the available frequencies and may calculate energy consumption at a corresponding frequency for each of the available voltages. The DVFS module 112 may select a pair of frequency and voltage, which cause minimum energy consumption, as a pair of optimal frequency and optimal voltage. The DVFS module 112 may scale the operating frequency of the first core to the optimal frequency and may scale the operating voltage of the first core to the optimal voltage.

In some embodiments of the present disclosure, after scaling the operating frequency of the first core to the optimal frequency, the DVFS module 112 may scale the operating voltage of the first core to the optimal voltage. For example, the DVFS module 112 may find available voltages, which are capable of being applied as an operating voltage of the first core together with the optimal frequency, based on the voltage information provided from the PMIC 11. The DVFS module 112 may determine energy consumption for each of the available voltages and may determine a voltage, which causes minimum energy consumption, as an optimal voltage. In the embodiment illustrated in FIG. 3, the DVFS module 112 may set a frequency, which causes minimum energy consumption of the first core, as an operating frequency of the first core, instead of the lowest frequency meeting performance that a task to be processed by the first core requires. In this case, the DVFS module 112 may calculate energy consumption in consideration of various factors affecting a magnitude of a static power and may set a frequency, which causes minimum energy consumption, as an operating frequency of the first core. As such, energy consumption of the first core may be minimized.

In some embodiments of the present disclosure, the DVFS module 112 may periodically perform operation S101 to operation S105. For example, the DVFS module 112 may perform operation S101 to operation S105 with respect to the first core at a period determined in advance.

In some embodiments of the present disclosure, the DVFS module 112 may perform operation S101 to operation S105 in response to temperature information provided from the TMU 140. For example, when a temperature of the SoC 100 or a temperature of the processor 110 is out of a range determined in advance, the DVFS module 112 may perform operation S101 to operation S105 for each of the cores 111. As another example, when a temperature of the first core is out of a range determined in advance, the DVFS module 112 may perform operation S101 to operation S105 with respect to the first core.

In some embodiments of the present disclosure, the DVFS module 112 may perform operation S101 to operation S105 in response to a change in an operating voltage of the first core. For example, when an operating voltage of the first core changes as much as a given value or more during a given unit time, the DVFS module 112 may perform operation S101 to operation S105.

In some embodiments of the present disclosure, when a new task starts to be processed by the first core (or when a new task is allocated to the first core), the DVFS module 112 may perform operation S101 to operation S105.

FIG. 4 illustrates the frequency table TBF, according to some embodiments of the present disclosure. Referring to FIGS. 1 to 4, the frequency table TBF may correspond to a list of frequencies capable of being used as an operating frequency to be provided to each of the cores 111 of the processor 110 by the CMU 130. For example, an operating frequency that is generated by the CMU 130 may be one of frequencies f1, f2, . . . , fn.

The frequency table TBF may be stored in the storage device 12 and may be loaded onto the RAM 120 in response to a request of the processor 110. The DVFS module 112 may find available frequencies with reference to the frequency table TBF loaded onto the RAM 120 and may calculate energy associated with each of the available frequencies. For example, the DVFS module 112 may determine frequencies, which are higher than or equal to the minimum frequency meeting the required performance, from among the frequencies f1, f2, . . . , fn as available frequencies (n being a natural number).

FIG. 5 illustrates the voltage table TBV, according to some embodiments of the present disclosure. Referring to FIGS. 1, 3, 4, and 5, the voltage table TBV may correspond to a list of voltage levels capable of being used as an operating voltage level to be supplied from the PMIC 11 to the processor 110. For example, an operating voltage level that is supplied from the PMIC 11 to each core of the processor 110 may be one of voltages V1, V2, . . . , Vm (m being a natural number).

In some embodiments of the present disclosure, an operating voltage level may be mapped onto an operating frequency of a corresponding core. For example, one of the voltages V1, V2, . . . , Vm may be determined as an operating voltage level depending on an operating frequency. In other words, available voltages associated with one operating frequency may be determined in advance, and the number of available voltages associated with one operating frequency may be one or more. The voltage table TBV may further include information about a mapping relationship between operating voltage levels and operating frequencies. As such, the relationship between an operating frequency and an operating voltage may be considered when performing DVFS. As a result, the accuracy of calculating energy consumption may be improved, and the performance of DVFS may be improved.

The voltage table TBV may be loaded onto the RAM 120 in response to a request of the processor 110. For example, the voltage table TBV may be provided from the PMIC 11 or may be stored in the storage device 12 in advance. The DVFS module 112 may calculate energy consumption associated with each of the available frequencies with reference to the voltage table TBV loaded onto the RAM 120.

FIG. 6 illustrates the leakage power table TBL, according to some embodiments of the present disclosure. Referring to FIGS. 1, 3, 4, 5, and 6, the leakage power table TBL may correspond to a list of leakage powers calculated in advance for each of states, based on a voltage level capable of being used as an operating voltage level to be supplied from the PMIC 11 to the processor 110 and a temperature of the processor 110.

In some embodiments of the present disclosure, instead of calculating a leakage power every time, the DVFS module 112 may find a leakage power associated with each of available frequencies with reference to the leakage power table TBL. For example, for each available frequency, the DVFS module 112 may find a level of a corresponding operating voltage with reference to the voltage table TBV and may find a corresponding leakage power based on temperature information provided from the TMU 140.

For example, when a level of an operating voltage is "V1" and a temperature is "tmp1", a leakage power may be "PL1". When a level of an operating voltage is "V2" and a temperature is "tmp2", a leakage power may be "PL2". In addition, when a level of an operating voltage is "Vm" and a temperature is "tmpk", a leakage power may be "PLs". The DVFS module 112 may find a leakage power, which is included in the leakage power table TBL and is calculated in advance, based on given voltage information and given temperature information. "k" and "s" may each be a natural number.

As another example, when a current temperature of a corresponding core (e.g., the processor 110 or the SoC 100) or a level of an operating voltage transferred to the corresponding core is not included in indexes of the leakage power table TBL, the DVFS module 112 may calculate the corresponding leakage power by performing an interpolation operation based on the leakage power table TBL. For example, when a current temperature "$tmp_{curr}$" of a corresponding core meets Equation 2 below, the DVFS module 112 may calculate a leakage power $PL_{curr}$ corresponding to the current temperature "$tmp_{curr}$" as shown in Equation 3, by performing an internal division operation ('a' being a real number of 0 or more and 1 or less). As in the above description, the DVFS module 112 may calculate a leakage power corresponding to a voltage level that is not included in the indexes of the leakage power table TBL.

$$tmp_{curr} = a*tmp1 + (1-a)*tmp2 \quad \text{[Equation 2]}$$

$$PL_{curr} = a*PL1 + (1-a)*PL2 \quad \text{[Equation 3]}$$

In some embodiments of the present disclosure, the leakage power table TBL may be stored in the storage device 12 and may be loaded onto the RAM 120. The leakage power table TBL may be generated in advance by an external device and may be stored in the storage device 12. Alternatively, the leakage power table TBL may be generated in advance by the processor 110 and may be stored in the storage device 12.

Figures 7, 8:
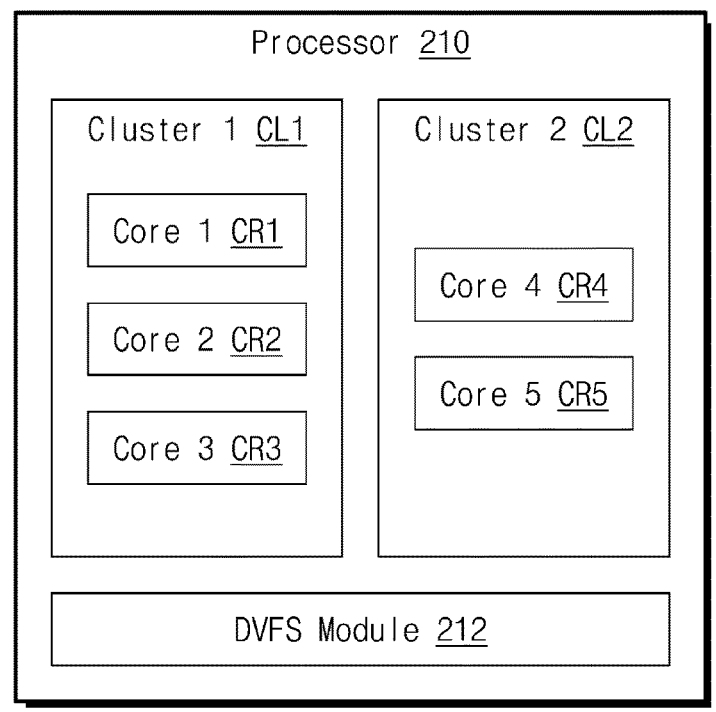
FIG. 7 illustrates a power table, according to some embodiments of the present disclosure.
FIG. 8 illustrates a block diagram of a processor, according to some embodiments of the present disclosure.

FIG. 7 illustrates a power table TBP, according to some embodiments of the present disclosure. Referring to FIGS. 1 to 7, the power table TBP may correspond to a list of static powers and dynamic powers calculated in advance for each of states, based on an operating frequency to be supplied from the CMU 130 to the processor 110, a voltage level capable of being used as an operating voltage level to be supplied from the PMIC 11 to the processor 110, a temperature of the processor 110, and a leakage power. The power table TBP may be implemented as a multi-dimensional table.

In some embodiments of the present disclosure, instead of calculating a leakage power every time, the DVFS module 112 may calculate energy consumption associated with each available frequency with reference to the power table TBP. For example, the DVFS module 112 may find a leakage power and a dynamic power, which correspond to each available frequency, based on voltage information provided from the PMIC 11 and temperature information provided from the TMU 140. The DVFS module 112 may calculate energy consumption based on the found leakage power and the found dynamic power.

For example, when an operating frequency is "f1", a level of an operating voltage is "V1", and a temperature is "tmp1", the leakage power may be "PL1", and the dynamic power may be "PD1". When the level of the operating voltage is "V1" and the temperature is "tmp2", the leakage power may be "PL2", and the dynamic power may be "PD1". In addition, when the level of the operating voltage is "Vm" and the temperature is "tmpk", the leakage power may be "PLs", and the dynamic power may be "PDr". "r" may be a natural number. The DVFS module 112 may find a leakage power and a dynamic power, which are included in the power table TBP and are calculated in advance, based on given voltage information and given temperature information. The DVFS module 112 may calculate static energy by multiplying the found leakage power by a time when a power is applied to a corresponding core. The DVFS module 112 may calculate dynamic energy by multiplying the found dynamic power by a time when an operating clock of a corresponding frequency is to be applied.

As another example, when a current temperature of a corresponding core (e.g., the processor 110 or the SoC 100) or a level of an operating voltage of the corresponding core is not included in indexes of the power table TBP, the DVFS module 112 may calculate a leakage power corresponding to the current temperature of the corresponding core by performing an interpolation operation based on the power table TBP. For example, as in the above description given with reference to FIG. 6, the DVFS module 112 may calculate a leakage power and a dynamic power that correspond to a level of an operating voltage or a temperature not included in the indexes of the power table TBP.

In some embodiments of the present disclosure, the power table TBP may be stored in the storage device 12 and may be loaded onto the RAM 120. The power table TBP may be generated in advance by an external device and may be stored in the storage device 12. Alternatively, the power table TBP may be generated in advance by the processor 110 and may be stored in the storage device 12.

FIG. 8 illustrates a block diagram of a processor 210, according to some embodiments of the present disclosure. The SoC 100 of FIGS. 1, 2, and 8 may include the processor 210 of FIG. 8 instead of the processor 110 of FIG. 1. The processor 210 may be understood as a multi-core processor including cores CR1, CR2, CR3, CR4 and CR5. The number of cores included in the processor 210 is not limited to the illustrated embodiment. For example, more than or fewer than five cores may be included in the processor 210. The processor 210 may include the cores CR1 to CR5 and a DVFS module 212. A configuration and an operation of the DVFS module 212 may be similar to those of the DVFS module 112 of FIG. 1.

As described above, the cores CR1 to CR5 may be grouped into a plurality of clusters CL1 and CL2 each of which operates based on an independent operating clock and/or an independent supply power. In the illustrated embodiment, the cluster CL1 may include the cores CR1, CR2, and CR3, and the cluster CL2 may include the cores CR4 and CR5. The number of clusters included in the processor 210 is not limited to the illustrated embodiment. For example, more than two clusters may be included in the processor 210.

Cores belonging to the same cluster may be subordinate to a clock domain in which the cores operate based on the same operating clock and/or a power domain in which the cores operate based on the same supply power. For example, all of the cores CR1, CR2, and CR3 included in the cluster CL1 may operate based on a first clock and/or a first power. All of the cores CR4 and CR5 included in the cluster CL2 may operate based on a second clock and/or a second power. Similarly, all of the cores in a third cluster may operate based on a third clock and/or a third power.

In some embodiments of the present disclosure, when the DVFS is performed with respect to one of cores subordinate to one voltage domain, the DVFS module 212 may consider a level of an operating voltage of other cores. For example, when the DVFS module 212 performs the DVFS with respect to the core CR1 based on the flowchart of FIG. 3, the DVFS module 212 may further obtain, from the PMIC 11, voltage information including a current voltage level (e.g., a voltage level of a current supply power of the cores CR2 and CR3) of a voltage domain that the core CR1 is subordinate to. The DVFS module 212 may calculate energy consumption of the core CR1 based on the obtained voltage information, for each of available frequencies, and may determine a frequency causing minimum energy consumption as an optimal frequency. As such, the accuracy of energy consumption calculated by the DVFS module 212 may increase, and thus, the energy consumption of the core CR1 may be minimized while considering a workload processing speed of the core CR1.

Figure 9:
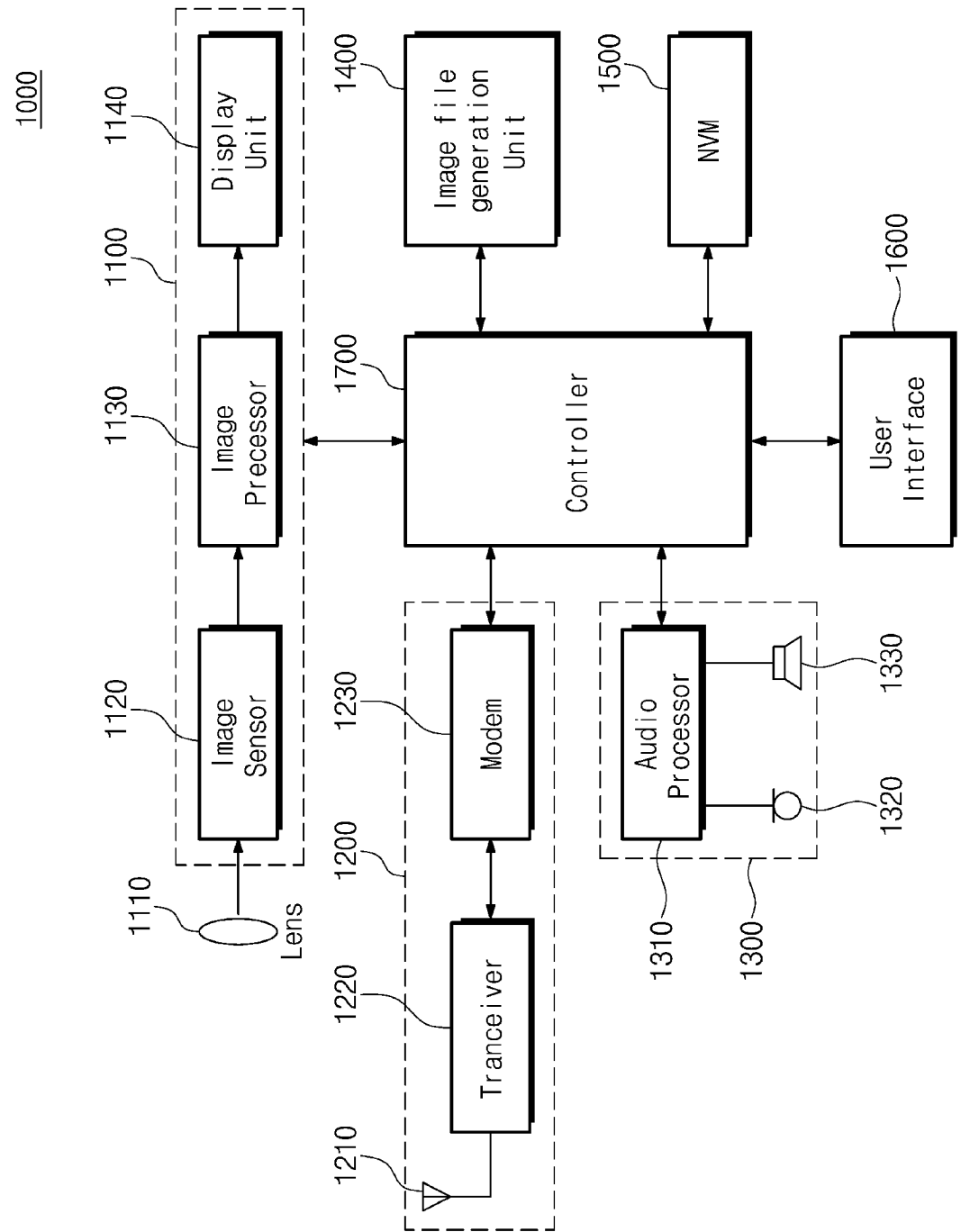
FIG. 9 illustrates a block diagram of an electronic device, according to some embodiments of the present disclosure.

FIG. 9 illustrates a block diagram of an electronic device 1000, according to some embodiments of the present disclosure. Referring to FIG. 9, an electronic device 1000 includes an image processing unit 1100, a wireless transceiver unit 1200, an audio processing unit 1300, an image file generation unit 1400, a nonvolatile memory device 1500, a user interface 1600, and a controller 1700.

The image processing unit 1100 may include a lens 1110, an image sensor 1120, an image processor 1130, and a display unit 1140. The wireless transceiver unit 1200 includes an antenna 1210, a transceiver 1220, and a modulator/demodulator (modem) 1230. The audio processing unit 1300 includes an audio processor 1310, a microphone 1320, and a speaker 1330.

The nonvolatile memory device 1500 may be implemented with a memory card (e.g., MMC, eMMC, SD, microSD and the like). In addition, the controller 1700 may be implemented with a SoC that drives an application program, an operating system, etc. A module (e.g., the DVFS module 112 of FIG. 1 or the DVFS module 212 of FIG. 8) capable of performing DVFS according to an embodiment of the present disclosure may be included in a kernel of an operating system that is driven in the system-on-chip SoC.

According to some embodiments of the present disclosure, when DVFS is performed, energy consumption associated with each available frequency meeting required performance may be calculated based on various factors affecting a workload execution time, a relationship between a frequency and an operating voltage, and a static power. An operating frequency of a specific core included in a computing system may be scaled to a frequency causing minimum energy consumption. As such, a workload processing time and energy consumption of the computing system may be minimized.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a system-on-chip (SoC) which includes a processor including a first core and a dynamic voltage and frequency scaling (DVFS) module and a clock management unit (CMU) for supplying an operating clock to the first core, the operating method comprising:
    obtaining a required performance of the first core;
    finding available frequencies meeting the required performance;
    obtaining information for calculating energy consumption for each of the available frequencies;
    calculating the energy consumption for each of the available frequencies, based on the information;
    determining a frequency, which causes minimum energy consumption, from among the available frequencies as an optimal frequency; and
    adjusting an operating frequency to be supplied to the first core to the optimal frequency,
    wherein the calculating of the energy consumption for each of the available frequencies based on the information includes:
    calculating a dynamic power for a first frequency from among the available frequencies, based on the information;
    calculating a static power for the first frequency, based on the information; and
    multiplying each of the dynamic power and the static power by a unit time, wherein the unit time is determined differently depending on whether the power is dynamic or static.

2. The method of claim 1, wherein the obtaining of the required performance of the first core includes:
    obtaining a minimum frequency corresponding to the required performance of the first core.

3. The method of claim 2, wherein the finding of the available frequencies includes:
    determining frequencies, which are higher than or equal to the minimum frequency, from among the frequencies in a list of frequencies capable of being used as the operating frequency of the first core.

4. The method of claim 1, wherein the obtaining of the information for calculating the energy consumption for each of the available frequencies includes:

obtaining information of frequencies capable of being used as the operating frequency to be supplied to the first core;
obtaining information of voltage levels capable of being used as a level of an operating voltage to be supplied to the first core; and
obtaining temperature information of the first core.

5. The method of claim 1, wherein the calculating of the static power for the first frequency based on the information includes:
finding a first leakage power, corresponding to a first voltage which corresponds to the first frequency and a current temperature of the first core, from a leakage power table, and
wherein the information includes a level of the first voltage and the current temperature of the first core.

6. An operating method of a system-on-chip (SoC) which includes a processor including a first cluster, which includes a first core and a second core, and a dynamic voltage and frequency scaling (DVFS) module and a clock management unit (CMU) for supplying an operating clock to the first core, the operating method comprising:
obtaining a required performance of the first core;
finding available frequencies meeting the required performance;
obtaining information for calculating energy consumption for each of the available frequencies;
calculating the energy consumption for each of the available frequencies, based on the information;
determining a frequency, which causes minimum energy consumption, from among the available frequencies as an optimal frequency; and
adjusting an operating frequency to be supplied to the first core to the optimal frequency,
wherein the information includes a level of an operating voltage of the second core included in the first cluster,
wherein the calculating of the energy consumption for each of the available frequencies based on the information includes:
calculating a dynamic power for a first frequency from among the available frequencies, based on the information;
calculating a static power for the first frequency, based on the information; and
multiplying each of the dynamic power and the static power by a unit time, wherein the unit time is determined differently depending on whether the power is dynamic or static.

7. The method of claim 6, wherein the obtaining of the required performance of the first core includes:
obtaining a minimum frequency required by the first core.

8. The method of claim 7, wherein the finding of the available frequencies includes:
determining frequencies, which are higher than or equal to the minimum frequency, from among the frequencies in a list of frequencies capable of being used by the first core as the available frequencies.

9. The method of claim 6, wherein the obtaining of the information for calculating the energy consumption for each of the available frequencies includes:
obtaining information of frequencies capable of being used as the operating frequency to be supplied to the first core;
obtaining information of the level of the operating voltage of the second core; and
obtaining temperature information of the first core.

10. The method of claim 6, wherein the calculating of the static power for the first frequency based on the information includes:
finding a first leakage power, corresponding to a first voltage which corresponds to the first frequency and a current temperature of the first core, from a leakage power table, and
wherein the information includes a level of the first voltage and the current temperature of the first core.

11. A system-on-chip (SoC) comprising:
a processor including a first core;
a clock management unit (CMU) configured to generate an operating clock and supply the operating clock to the first core, under control of the processor; and
a memory configured to store a dynamic voltage and frequency scaling (DVFS) program,
wherein the DVFS program, when executed by the processor, causes the processor to:
obtain a required performance of the first core;
find available frequencies meeting the required performance;
obtain information for calculating energy consumption for each of the available frequencies;
calculate the energy consumption for each of the available frequencies, based on the information;
determine a frequency, which causes minimum energy consumption, from among the available frequencies as an optimal frequency; and
scale an operating frequency to be supplied to the first core to the optimal frequency,
wherein the DVFS program, when executed by the processor, further causes the processor to:
calculate a first dynamic power and a first static power for a first frequency from among the available frequencies, based on the information;
calculate first dynamic energy for the first frequency based on the first dynamic power;
calculate first static energy for the first frequency based on the first static power; and
calculate first energy consumption associated with the first frequency by multiplying the first dynamic energy and the first static energy by a unit time, wherein the unit time is determined differently depending on whether the energy is dynamic or static.

12. The SoC of claim 11, wherein the DVFS program, when executed by the processor, further causes the processor to:
obtain a minimum frequency corresponding to the required performance of the first core;
obtain a frequency table including a list of frequencies capable of being used by the first core; and
determine frequencies, which are higher than or equal to the minimum frequency, from among the frequencies in the list as the available frequencies.

13. The SoC of claim 11, further comprising:
a temperature sensor configured to measure a temperature of the first core under control of the processor; and
a temperature management unit (TMU) configured to manage the temperature of the first core, based on a measurement of the temperature sensor,
wherein the DVFS program, when executed by the processor, further causes the processor to:
obtain, from the CMU, information of frequencies capable of being used as the operating frequency to be supplied to the first core;

obtain information of voltage levels capable of being used as an operating voltage level to be supplied to the first core; and obtain temperature information of the first core from the TMU.

14. The SoC of claim 11, wherein the DVFS program, when executed by the processor, further causes the processor to:

find a first leakage power, corresponding to a first voltage which corresponds to the first frequency and a current temperature of the first core, from a leakage power table, and wherein the information includes a level of the first voltage and the current temperature of the first core.

15. The SoC of claim 11, further comprising:

a temperature sensor configured to measure a temperature of the first core under control of the processor; and a temperature management unit (TMU) configured to manage the temperature of the first core, based on a measurement of the temperature sensor, wherein the processor further includes a first cluster including the first core and a second core, and wherein the DVFS program, when executed by the processor, further causes the processor to:

obtain, from the CMU, information of frequencies capable of being used as the operating frequency to be supplied to the first core;

obtain information of a level of an operating voltage of the second core; and obtain temperature information of the first core from the TMU.

16. The SoC of claim 15, wherein the DVFS program, when executed by the processor, further causes the processor to:

calculate the first dynamic power for the first frequency from among the available frequencies, based on the level of the operating voltage of the second core;

calculate the first dynamic energy for the first frequency, based on the first dynamic power;

calculate the first static power for the first frequency, based on the temperature information of the first core and the level of the operating voltage of the second core;

calculate the first static energy for the first frequency, based on the first static power; and calculate the first energy consumption for the first frequency, based on the first dynamic energy and the first static energy.

* * * * *